US005907374A

United States Patent [19]
Liu

[11] Patent Number: 5,907,374
[45] Date of Patent: May 25, 1999

[54] METHOD AND APPARATUS FOR PROCESSING A COMPRESSED INPUT BITSTREAM REPRESENTING AN INFORMATION SIGNAL

[75] Inventor: Sam J. Liu, Menlo Park, Calif.

[73] Assignee: Hewlett-Packard Company, Palo Alto, Calif.

[21] Appl. No.: 08/884,751

[22] Filed: Jun. 30, 1997

[51] Int. Cl.⁶ .................................................. H04N 7/26
[52] U.S. Cl. ......................................... 348/845; 348/423
[58] Field of Search .................................... 348/384, 390, 348/400, 401, 402, 423, 845; H04N 7/26

[56] References Cited

U.S. PATENT DOCUMENTS

| | | | |
|---|---|---|---|
| 5,729,293 | 3/1998 | Keesman | 348/401 |
| 5,764,298 | 6/1998 | Morrison | 348/500 |
| 5,805,220 | 9/1998 | Keesman | 348/385 |
| 5,805,224 | 9/1998 | Keesman | 348/423 |

OTHER PUBLICATIONS

Ghanbari, Mohammad and Assuncao, Pedro, "Control of MPEG–2 Video Traffic in an ATM Environment", Proceedings of the 1996 IEEE International Conference on Image Processing, ICIP's96, Part 2, Lausanne, Switzerland, Sep. 16–19, 1996, pp. 837–840.

*Primary Examiner*—Howard Britton
*Attorney, Agent, or Firm*—Ian Hardcastle

[57] ABSTRACT

Apparatus for processing a compressed input bitstream representing an information signal. The apparatus processes the compressed input bitstream in a way that changes the information signal represented by the compressed input bitstream, and comprises a layered decoder that decodes the compressed input bitstream to provide a decoded bitstream, a decoded bitstream processor that processes the decoded bitstream to provide a modified bitstream, a layered encoder that re-encodes the modified bitstream to provide a compressed output bitstream, and a selective interconnection path. The layered decoder includes serially-connected decoding modules. The decoded bitstream processor processes the decoded bitstream in a way that modifies the information signal. The layered encoder includes serially-connected encoding modules, each of which corresponds to one of the decoding modules in the layered decoder. The selective interconnection path selectively connects the output of one of the decoding modules to the input of the decoded bitstream processor and selectively connects the output of the decoded bitstream processor to the input of the one of the encoding modules corresponding to the one of the decoding modules. The layered decoder may include an element that derives bitstream parameters from the compressed input bitstream, and the apparatus may additionally comprise a bitstream parameter forwarding path that interconnects the layered decoder to the layered encoder. At least one of the encoding modules may be connected to the parameter forwarding path and may perform an encoding operation using the bitstream parameters derived from the compressed input bitstream.

20 Claims, 6 Drawing Sheets

METHOD AND APPARATUS FOR PROCESSING A COMPRESSED INPUT BITSTREAM REPRESENTING AN INFORMATION SIGNAL

FIELD OF THE INVENTION

The invention relates to processing bitstreams, and, in particular, to processing compressed bitstreams in a way that reduces the resources required to perform the processing.

BACKGROUND OF THE INVENTION

Bitstreams representing information signals are often subject to compression to conserve communications bandwidth or signal storage requirements. For example, the bandwidth or signal storage required to transmit or store a video bitstream representing a motion picture can be reduced by a factor of the order of 100 by applying suitable spatial and temporal compression. Such spatial and temporal compression schemes include the MPEG-1 and MPEG-2 schemes standardized by the ISO.

Production, distribution and display of video bitstreams representing video signals often involves processing the video bitstream in some way. Such processing may modify the video signal represented by the video bitstream. For example, the processing may apply color correction or a different gamma correction, or may apply noise reduction to the video signal. Such processing may additionally or alternatively be performed to convert the video signal from one video standard to another. In this, the number of picture elements (pixels) in each picture may be changed, and the picture rate may additionally or alternatively be changed. Moreover, when the video bitstream is compressed, the processing may also modify the bitstream characteristics of the compressed video bitstream. For example, the compressed video bitstream may be processed to change its bit rate, or to restructure it so that it can be decoded using a decoder having a decoder buffer of a different size.

An example of a conventional apparatus 10 for processing a compressed input bitstream is shown in FIG. 1. In this example, the compressed input bitstream is an MPEG-compliant video bitstream. Similar arrangements may be used for processing video bitstreams compressed according to other standards. In the conventional apparatus 10 shown in FIG. 1, the MPEG decoder 14 decodes the compressed input bitstream 12 to recover the video bitstream 16. The video processor 18 applies the processing defined by the processing selection block 20 to the video bitstream 16 to generate the modified video bitstream 22. The modified video bitstream is fed to the MPEG encoder 24 that generates the compressed output bitstream 26 by re-encoding the modified video bitstream to have bitstream characteristics, such as bit rate, buffer size, etc., defined by the processing selection block 20. The bitstream characteristics of the compressed output bitstream may be the same as, or different from, those of the compressed input bitstream 12. If the processing selected by the processing selection block only involves changing the bitstream characteristics, the video processor 18 simply passes the video bitstream 16 to the MPEG encoder 24 without modifying it.

The encoding operation performed by the MPEG encoder 24 on the modified video bitstream 22 is considerably more computationally intensive than the decoding operation performed by the MPEG decoder 14 on the compressed input bitstream 12. For example, to encode a video bitstream representing an NTSC video signal in real time requires special hardware or a computer based on a microprocessor of equivalent computing power to a 686-type microprocessor. Consequently, the conventional apparatus 10 is complex and expensive.

Of the operations performed by the MPEG encoder 24, the motion estimation operation used to determine the motion vector for each block is computationally the most intensive. The number of operations required to perform motion estimation can be scaled down by reducing the scope of the motion search region, or by using a fast motion search algorithm, but both of these approaches inevitably impair video quality. To ensure an acceptable video quality, the MPEG encoder 24 will encode most sequences using relatively large search regions with an efficient, but suboptimal, motion estimation algorithm notwithstanding the large computational resources that this approach demands.

What is needed is the ability to perform the above-mentioned processing on compressed input bitstreams without the need for special hardware, or using a computer based on a lower-cost microprocessor. What is also needed is the ability to perform the above-mentioned processing on compressed input bitstreams faster than in real time using currently-available hardware.

In video production and distribution environments, the video bitstream may be subject to a number of different processing operations. Multiple processing operations are conventionally applied to the video bitstream by concatenating a number of processors. Each processor operates on the conventional, pixel-level, video bitstream generated by the preceding processor. Such an arrangement of concatenated processors would replace the video processor 18 shown in FIG. 1.

Using a concatenated arrangement of processors to perform multiple processing operations on a video bitstream normally requires that the video bitstream operated on by each processor be a conventional video bitstream. Processors that operate on compressed or partially-compressed video bitstreams cannot be concatenated with processors that operate on conventional video bitstreams or with processors that operate on video bitstreams that are differently compressed. Moreover, processors that are designed to operate on a conventional video bitstream, i.e., on an uncompressed video bitstream, require that computational resources be expended to decode the compressed input bitstream fully before processing, and to fully re-encode the modified bitstream generated by the processors. Finally, processing systems that precede the processors by a conventional decoder and follow the processors with a conventional encoder require the compressed input bitstream to be compressed according to the compression standard of the decoder, and provide the output bitstream compressed according to the compression standard of the encoder.

Accordingly, what is also needed is a video processing system that allows processors that operate on bitstreams in different states of compression to be concatenated, that can process a compressed input bitstream in any state of compression and that can generate a compressed output bitstream in a state of compression that is greater than, less than, or the same as that of the compressed input bitstream.

SUMMARY OF THE INVENTION

The invention provides an apparatus for processing a compressed input bitstream representing an information signal such as a video signal. The apparatus processes the compressed input bitstream in a way that changes the information signal represented by the compressed input bitstream. The apparatus comprises a layered decoder that decodes the compressed input bitstream to provide a decoded bitstream, a decoded bitstream processor that processes the decoded bitstream to provide a modified bitstream, a layered encoder that re-encodes the modified bitstream to provide a compressed output bitstream, and a selective interconnection path. The layered decoder includes serially-connected decoding modules. The decoded bitstream processor processes the decoded bitstream in a way that modifies the information signal. The layered encoder includes serially-connected encoding modules, each of which corresponds to one of the decoding modules in the layered decoder. The selective interconnection path selectively connects the output of one of the decoding modules to the input of the decoded bitstream processor and selectively connects the output of the decoded bitstream processor to the input of the one of the encoding modules corresponding to the one of the decoding modules.

The invention also provides an apparatus for modifying the bitstream characteristics of a compressed input bitstream representing an information signal. This apparatus modifies the bitstream characteristics of the compressed input bitstream without necessarily substantially changing the information signal represented by the compressed input bitstream. The apparatus comprises a controller that provides an output bitstream definition defining the bitstream characteristics of a compressed output bitstream; a layered decoder that includes a deriving element that derives bitstream parameters from the compressed input bitstream; a bitstream parameter forwarding path; and a layered encoder that generates the compressed output bitstream. The layered decoder decodes the compressed input bitstream to provide a decoded bitstream. The bitstream parameter forwarding path is connected to receive the bitstream parameters from the layered decoder. The layered encoder is connected to the bitstream parameter forwarding path and re-uses the bitstream parameters derived from the compressed input bitstream to re-encode the decoded bitstream in accordance with the output bitstream definition.

The invention also provides a method for processing a compressed input bitstream representing an information signal. The method processes the compressed input bitstream in a way that changes the information signal represented by the compressed input bitstream. In the method, the compressed input bitstream is partially decoded to provide a decoded bitstream. The decoded bitstream is a partially-encoded bitstream representing the information signal. A modified bitstream is generated by processing the decoded bitstream in a way that modifies the information signal. The modified bitstream is a partially-encoded bitstream. Finally, the modified bitstream is re-encoded to generate a compressed output bitstream.

The invention further provides a method for modifying the bitstream characteristics of a compressed input bitstream representing an information signal. This method modifies the bitstream characteristics without necessarily substantially changing the information signal represented by the compressed input bitstream. In the method, an output bitstream definition is generated. The output bitstream definition defines the bitstream characteristics of a compressed output bitstream. Bitstream parameters are derived from the compressed input bitstream. The compressed input bitstream is at least partially decoded to provide a decoded bitstream. Finally, the decoded bitstream is re-encoded using the parameters derived from the compressed input bitstream to generate the compressed output bitstream having the bitstream characteristics defined by the output bitstream definition.

The invention also provides an apparatus for processing a compressed input bitstream representing an information signal. The apparatus processes the compressed input bitstream in a way that changes the information signal represented by the compressed input bitstream. The apparatus comprises a first compression state translation unit, a processor and a second compression state translation unit. The first compression state translation unit receives the compressed input bitstream as an input bitstream and changes the compression state of the compressed input bitstream to generate an output bitstream. The processor receives the output bitstream of the first compression state translation unit, and processes the output bitstream to generate a modified bitstream. The processor processes the output bitstream in a way that modifies the information signal. The second compression state translation unit receives the modified bitstream as an input bitstream and changes the compression state of the modified bitstream to generate an output bitstream as the compressed output bitstream.

The first and second compression state translation units each include layered encoding/decoding modules, an input interface module and an output interface module. The input interface module selectively connects the input bitstream to one of the encoding/decoding modules. The one of the encoding/decoding modules to which the input bitstream is connected depends on the compression state of the input bitstream. The output interface module selectively receives a bitstream from the output of one of the encoding/decoding modules as the output bitstream. The one of the encoding/decoding modules from which the bitstream is received depends on the compression state of the output bitstream. The compression state of the output bitstream may be different from that of the input bitstream.

Finally, the invention provides a method for processing a compressed input bitstream representing an information signal. In the method, layered encoding/decoding modules are provided. A first set of encoding/decoding modules and a second set of encoding/decoding modules are selected from the layered encoding modules. The compression state of the compressed input bitstream is changed to provide a first output bitstream using the first set of encoding/decoding modules. The first output bitstream is processed to generate a modified bitstream. The first output bitstream is processed by in a way that modifies the information signal but generates the modified bitstream in the same compression state as the first output bitstream. Finally, the compression state of the modified bitstream is changed using the second set of encoding/decoding modules to generate a second output bitstream.

DETAILED DESCRIPTION OF THE INVENTION

In the following description, reference will be made to the compression state of an information signal. Bitstreams compressed according to MPEG and similar compression schemes are the result of a prescribed number of layers of compression applied to the original information signal. Compressed bitstreams can also be generated by applying fewer than the prescribed number of layers of compression to the information signal. Accordingly, a compressed bitstream representing an information signal can be regarded as having a compression state that depends on the number of layers of compression that have been applied to the information signal. The compression state of a compressed bitstream can be increased by applying additional layers of encoding operations to the compressed bitstream, and can be decreased by applying layers of decoding operations to the compressed bitstream.

Figure 1:
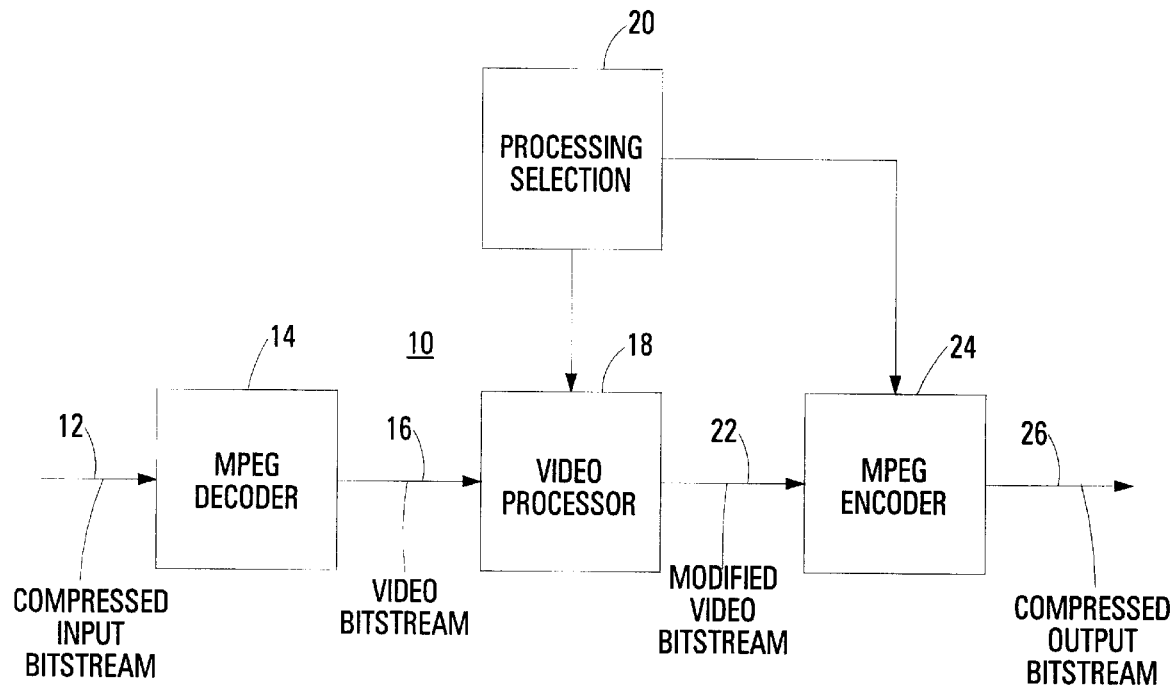
FIG. 1 is a block diagram of a conventional apparatus for processing a compressed input bitstream.
Figure 2:
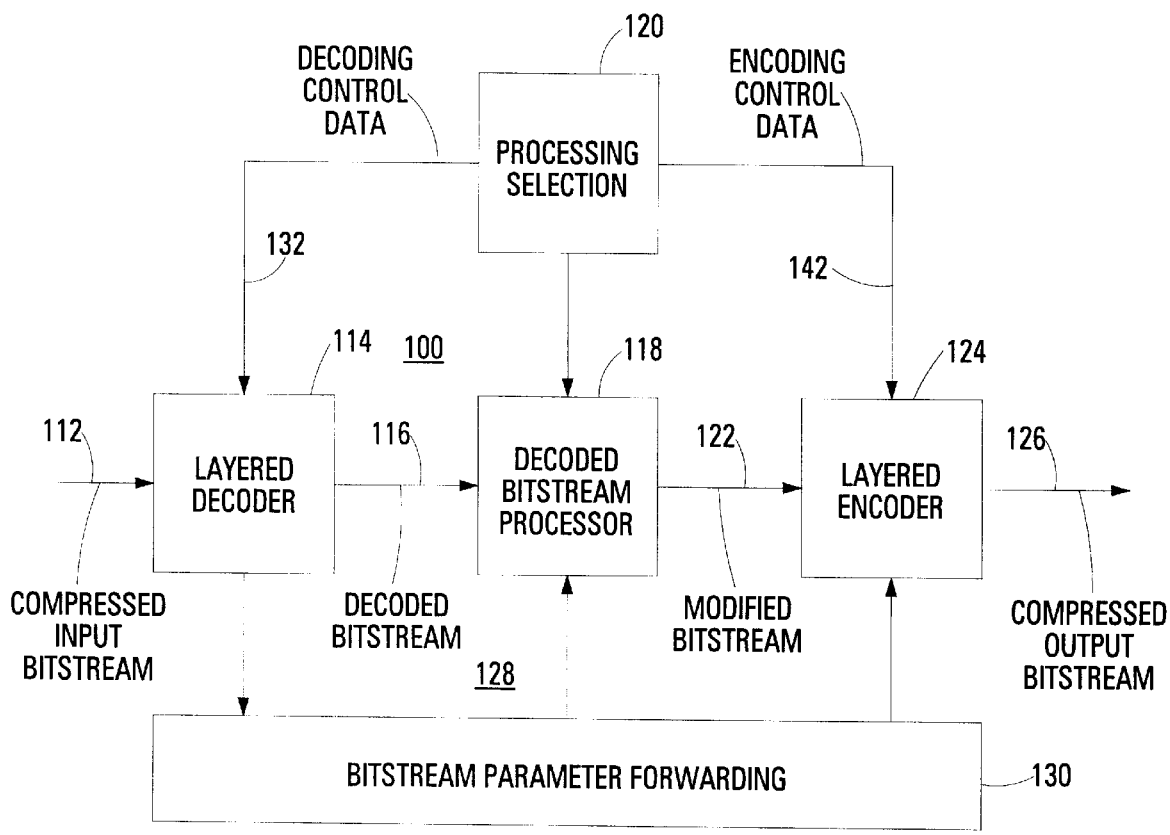
FIG. 2 is a block diagram of a first embodiment of an apparatus according to the invention for processing a compressed input bitstream.

A first embodiment 100 of a compressed bitstream processing apparatus according to the invention is shown in FIG. 2. The example shown is adapted for processing an MPEG-compliant video bitstream, but can easily be adapted for processing other types of compressed bitstreams representing information signals. The compressed bitstream processing apparatus 100 is composed of four main units, the layered decoder 114, the decoded bitstream processor 118, the layered encoder 124 and the bitstream parameter forwarding path 128 that interconnects the layered decoder and the layered encoder. In addition, if the compressed bitstream processing apparatus is designed to allow a user to select or define the processing operation performed, the apparatus additionally includes the processing selection module 120 that receives instructions from the user and controls the processing performed by the layered decoder, the processor and the layered encoder. Otherwise, the processing selection module controls the processing performed by the layered decoder, the bitstream processor and the layered encoder so that the compressed bitstream processing apparatus performs a predetermined processing operation on the compressed input bitstream.

The layered decoder 114 decodes the compressed input bitstream 112 to generate the decoded bitstream 116 and passes the decoded bitstream to the decoded bitstream processor 118. The layered decoder generates the decoded bitstream in the compression state required by the decoded bitstream processor 118. For example, when the decoded bitstream processor is a conventional bitstream processor that operates on a conventional video bitstream, the decoded bitstream is a conventional video bitstream. Alternatively, the decoded bitstream processor may operate on a partially-compressed video bitstream, such as a bitstream composed primarily of DCT coefficients. In this case, the decoded bitstream is composed primarily of DCT coefficients.

The layered decoder 114 additionally derives from the compressed input bitstream various parameters that will be called bitstream parameters. The bitstream parameters are parameters that are extracted from the compressed input bitstream 112, or that are derived by the layered decoder in the course of decoding the compressed input bitstream. In the following description, the term derived will be understood to encompass either of these possibilities. The bitstream parameters collectively define each picture of the video bitstream represented by the compressed input bitstream, and include coded, quantized DCT coefficients, motion vectors, quantizing tables, macroblock-type information, and header information. The header information includes statistical information such as the number of bits per block and the number of bits per picture. The layered decoder forwards the bitstream parameters to the layered encoder 124 through the bitstream parameter forwarding path 128.

The decoded bitstream processor 118 processes the decoded bitstream 116 it receives from the layered decoder 114, and passes the resulting modified bitstream 122 to the layered encoder 124. The layered encoder is also connected to the bitstream parameter forwarding path 128 from which it receives the bitstream parameters derived from the compressed input bitstream 112 by the layered decoder. The layered encoder generates the compressed output bitstream 126 by wholly or partially re-encoding the modified bitstream. In this embodiment, the extent of the re-encoding performed by the layered encoder is the same as the extent of the decoding performed by the layered decoder.

The layered decoder 114 operates only to decode the compressed input bitstream 112 to the state of compression required by the decoded bitstream processor 118. This state of compression is less than that of the compressed input bitstream 112, but may be greater than that of a conventional video bitstream. In this embodiment, the modified bitstream 122 is in the same state of compression as the decoded bitstream 116. The layered encoder 124 re-encodes the modified bitstream re-using at least some of the bitstream parameters derived from the compressed input bitstream 112 by the layered decoder 114. Re-using the bitstream parameters saves the layered encoder from expending computational resources to calculate new parameters equivalent to the bitstream parameters that are re-used. Consequently, the compressed bitstream processing apparatus 100 according to the invention can perform the desired processing of the compressed input bitstream using a smaller scale of hardware or a less powerful computer or digital signal processor than a conventional compressed bitstream processing apparatus. Alternatively, compared with a conventional apparatus, the compressed bitstream processing apparatus according to the invention can perform the desired processing at a faster rate, e.g., faster than real-time, using given hardware or a given computer.

The compressed bitstream processing apparatus 100 will now be described in more detail. In particular, the layered decoder 114 and the layered encoder 124 will be described in detail with reference to FIGS. 2 and 3.

The layered decoder 114 will be described first. The layered decoder receives the compressed input bitstream 112, partially or fully decodes the compressed input bitstream, and supplies the resulting decoded bitstream 116 to the decoded bitstream processor 118. The layered decoder also derives bitstream parameters from the compressed input bitstream and supplies the bitstream parameters to the layered encoder 124 via the bitstream parameter forwarding path 128. In the example shown, the compressed input bitstream and the compressed output bitstream 126 are both MPEG-compliant video bitstreams.

Like a conventional MPEG decoder, the layered decoder 114 includes a number of serially-connected decoding modules that operate together to decode the compressed input bitstream 112. Unlike a conventional MPEG decoder, the layered decoder can stop decoding the compressed input bitstream at the completion of decoding by any one of the decoding modules so that the compressed input bitstream is decoded only to the compression state required by the decoded bitstream processor 118. The decoding module at which the layered decoder stops decoding depends on decoding control data supplied by the processing selection module 120 via the control path 132. When the decoding control data set the layered decoder so that all the decoding modules operate to decode the compressed input bitstream, the layered decoder decodes the compressed input bitstream to generate the decoded bitstream 116 as a conventional video bitstream. The pictures of a conventional video bitstream are in presentation order and the bitstream includes a pixel value for each pixel of each picture. When the decoding control data set the layered decoder so that fewer than all the decoding modules are selected to decode the compressed input bitstream, the compressed input bitstream is only partially decoded. In this case, the decoded bitstream 116 is not a conventional video bitstream, but is partially compressed. For example, the decoded bitstream may comprise a set of DCT values for each block of each picture.

Since the layered decoder 114 can stop decoding the compressed input bitstream at the completion of decoding by any one of the decoding modules, the output of each decoding module is not only connected to the input of the following decoding module, but is also connected to the output bus 134 that feeds the output selector 215. The output selector will be described in more detail below.

The decoding modules that constitute the layered decoder 114 are based on corresponding modules of a conventional MPEG decoder. It is assumed that the person of ordinary skill in this art is familiar with the structure and operation of such conventional modules, so the decoding modules will only be described briefly. The decoding modules include the decoder buffer 201, the demultiplexer 203, the inverse variable-length coder 205, the inverse quantizer 207, the inverse discrete cosine transform module 209, the motion compensator 211 and the spatial bitstream output module 213.

The compressed input bitstream, a constant bit-rate video stream in this example, is temporarily stored in the decoder buffer 201. The compressed input bitstream is transferred from the decoder buffer to the demultiplexer 203 one picture at a time in response to timing control data located in headers embedded in the bitstream. The demultiplexer divides the portion of the compressed input bitstream relating to each picture into its constituent bitstream parameters. The bitstream parameters collectively define each picture of the video bitstream represented by the compressed input bitstream, and include coded, quantized DCT coefficients, motion vectors, quantizing tables, macroblock-type information, color data, and header information. The header information includes statistical information such as the number of bits per block and the number of bits per picture. The decoder bitstream parameter bus 136 interconnects the output of the demultiplexer with inputs of the other decoding modules, and passes the bitstream parameters from the demultiplexer to the other decoding modules. The decoding modules each perform a decoding operation using not only the data received from one or more preceding decoding modules but also the bitstream parameters received via the decoder bitstream parameter bus. In addition, the decoder bitstream parameter bus is connected to the bitstream parameter forwarding module 130 to form part of the bitstream parameter forwarding path 128.

The bitstream parameter forwarding module 130 receives the bitstream parameters from the layered decoder 114 via the decoder bitstream parameter bus 136. The bitstream parameter forwarding module temporarily stores those of the bitstream parameters that will be used by either or both of the decoded bitstream processor 118 and the layered encoder 124 until they are needed. The bitstream parameter forwarding module also feeds the bitstream parameters to an appropriate channel of the encoder bitstream parameter bus 140. The encoder bitstream parameter bus connects the bitstream parameters to the encoding modules of the layered encoder in which the bitstream parameters will later be used to re-encode the modified bitstream 122.

The inverse variable length coder 205 receives the coded, quantized DCT coefficients from the demultiplexer 203 and reverses the variable length coding applied to these coefficients to generate quantized DCT coefficients. The quantized DCT coefficients are fed to the inverse quantizer 207 and also to the output bus 134 for connection to the output selector 215. In addition, the quantized DCT coefficients may be fed as bitstream parameters to the bitstream parameter forwarding path 128 for forwarding to the layered encoder 124.

The inverse quantizer 207 receives the quantized DCT coefficients from the inverse variable length coder 205, and also receives the quantizing tables from the demultiplexer 203 via the decoder bitstream parameter bus 136. The inverse quantizer reverses the quantizing applied to the quantized DCT coefficients to generate blocks of DCT coefficients. The DCT coefficients are fed to the inverse DCT module 209, and also to the output bus 134 for connection to the output selector 215. In addition, the DCT coefficients may be fed as bitstream parameters to the bitstream parameter forwarding path 128 for forwarding to the layered encoder 124.

The inverse DCT module 209 receives the blocks of DCT coefficients from the inverse quantizer 207 and applies an inverse discrete cosine transform to the blocks of DCT coefficients to generate respective blocks of differences. The blocks of differences are fed to the motion compensator 211, and also to the output bus 134 for connection to the output selector 215. In addition, the blocks of differences may be fed as bitstream parameters to the bitstream parameter forwarding path 128 for forwarding to the layered encoder 124.

The motion compensator 211 receives the blocks of differences from the inverse DCT module 209 and also receives respective reference blocks from a reconstructed picture stored in a page of a picture memory (not shown) in the spatial bitstream output module 213. The picture memory selects the respective reference blocks from the reconstructed picture in response to the motion vectors for the blocks of differences. The picture memory receives the motion vectors from the multiplexer 203 via the decoder bitstream parameter bus 136. The motion compensator adds each difference in the block of differences to a corresponding pixel value in the reference block to generate a new pixel value of a new reconstructed picture block. The motion compensator feeds the reconstructed picture block to the spatial bitstream output module 213. The motion compensator also feeds the reconstructed picture block onto the output bus 134 for connection to the output selector 215. The successive reconstructed picture blocks fed to the output selector constitute a block-format video bitstream in which the pictures are in coding order. Coding order differs from presentation order, i.e., the order in which the pictures are presented to the viewer.

When the block of differences is a block of a picture that has been encoded as a B-picture, the reference block may be selected from two reconstructed pictures stored in the picture memory. However, to simplify the following description, a reference to selecting a block of a reconstructed picture will be taken to encompass selecting blocks of more than reconstructed picture when the picture is decoded or encoded as a B-picture.

The spatial bitstream output module 213 receives each reconstructed picture block from the motion compensator 211 and stores the reconstructed picture block in the picture memory as a block of a reconstructed picture being constructed in a page of the picture memory. This page is different from the page in which the picture that supplied the reference block is stored. When all the blocks of a reconstructed picture have been stored in the picture memory, the reconstructed picture is available for the spatial bitstream output module to read it out onto the output bus 134 for connection the output selector 215. The spatial bitstream output module reads out the reconstructed picture in raster scan format and in presentation order as a picture of a conventional video bitstream.

As noted above, the inverse variable-length coder 205, the inverse quantizer 207, the inverse DCT module 209, the motion compensator 211 and the spatial bitstream output module 213 operate selectively in response to the decoding control data received from the processing selection module 120 via the control path 132. The decoding control data select the decoding modules actually used to decode the compressed input bitstream. For example, if the user commands the system to perform spatial filtering on the compressed input bitstream, and the decoded bitstream processor 118 is capable of performing such filtering on blocks of DCT coefficients, the decoding control data will enable the inverse variable-length coder 205 and the inverse quantizer 207, and will cause the output selector 215 to connect the partially-decoded bitstream from the inverse quantizer to the decoded bitstream processor 118 as the decoded bitstream 116. The decoding control data will also deactivate the decoding modules downstream of the decoding module whose output is selected as the decoded bitstream 116, i.e., the inverse DCT module 209, the motion compensator 211 and the spatial bitstream output module 213. These decoding modules can be deactivated since they are not required to decode the compressed input bitstream to the DCT coefficient level. This enables computational resources that would otherwise be used for these decoding modules to be used for other purposes.

In the layered decoder 114, the output selector 215 is connected to the output bus 134, through which it receives the outputs of the decoding modules 201–213. The output selector is also connected to the control path 132 through which it receives the decoding control data. The output of the output selector is connected to the input of the decoded bitstream processor 118. In response to the decoding control data, the output selector selects the output of one of the decoding modules that will serve as the decoded bitstream 116, and feeds this bitstream to the input of the decoded bitstream processor 118.

It should be noted that when the compressed bitstream processing apparatus 100 according to the invention is embodied in a computer or digital signal processor, the computer or digital signal processor may lack elements such as the bitstream parameter forwarding path 128, the bitstream parameter forwarding module 130, the output bus 134 and the decoder bitstream parameter bus 136. Instead, for example, the output selector 215 may communicate to the decoded bitstream processor 118 the addresses where the data output by the last of the decoding modules to decode the compressed input bitstream are stored. The decoded bitstream processor can then fetch the data stored at these addresses and perform the decoded bitstream processing on these data. Similarly, the bitstream parameter forwarding path 128 may communicate to the layered encoder 124 the addresses at which the bitstream parameters derived from the compressed input bitstream by the layered decoder are stored. The appropriate encoding module of the layered encoder 124 can then fetch the bitstream parameters stored at these addresses to use them in performing its encoding processing. It should also be noted that, in computer-based and DSP-based embodiments, the decoding modules may be ephemeral, and the apparatus may lack elements corresponding to those of the decoding modules that are not used to decode the compressed input bitstream 112.

The decoded bitstream processor 118 will be described next. The decoded bitstream processor receives the decoded bitstream 116 from the layered decoder 114 and processes the decoded bitstream to generate the modified bitstream 122. The decoded bitstream processor can perform any conventional processing operation that is not part of the MPEG compression. These processing operations include color correction, scaling, sharpening, noise reduction, etc. In the example shown, the processing operation performed by the decoded bitstream processor 118 on the decoded bitstream 116 is user specific, and is set by the user's input to the processing selection module 120.

The processing operation performed by the decoded bitstream processor 118 depends on the compression state of the decoded bitstream 116. For example, the decoded bitstream processor can perform a picture sharpening operation on either the conventional video bitstream generated by the spatial bitstream output module 213 or the DCT coefficients generated by the inverse quantizer 207. To achieve the desired picture sharpening result, the decoded bitstream processor will perform a different picture sharpening operation, depending on whether the decoded bitstream 116 was generated by the spatial bitstream output module or by the inverse quantizer.

Whether the decoded bitstream 116 processed by the decoded bitstream processor 118 is the result of the layered decoder 114 fully decoding or only partially decoding the compressed input bitstream 112 depends on a trade-off between picture quality and computational complexity. For example, when the decoded bitstream processor performs a picture sharpening operation on the conventional video bitstream generated by the spatial bitstream output module 213 of the layered decoder, the results are typically subjectively better than when those obtained when the decoded bitstream processor performs a picture sharpening operation on the DCT coefficients generated by inverse quantizer 207. However, the decoded bitstream processor operating on the conventional video bitstream is less cost effective because more computational resources must be expended to provide the additional decoding and encoding modules required for the layered decoder to decode the compressed input bitstream to the conventional video bitstream level and for the layered encoder to re-encode the modified video bitstream from the conventional video bitstream level.

In instances in which the compressed bitstream processing apparatus 100 is configured to modify the bitstream characteristics of the compressed input bitstream 112 without modifying the video signal represented by the compressed input bitstream, the processing selector 120 configures the decoded bitstream processor 118 as an identity unit, and the modified bitstream 122 is identical to the decoded bitstream 116. Examples of modifying the bitstream characteristics of the compressed input bitstream include changing the bit rate, changing the reference buffer size, changing the quantizing table, etc.

Figure 3:
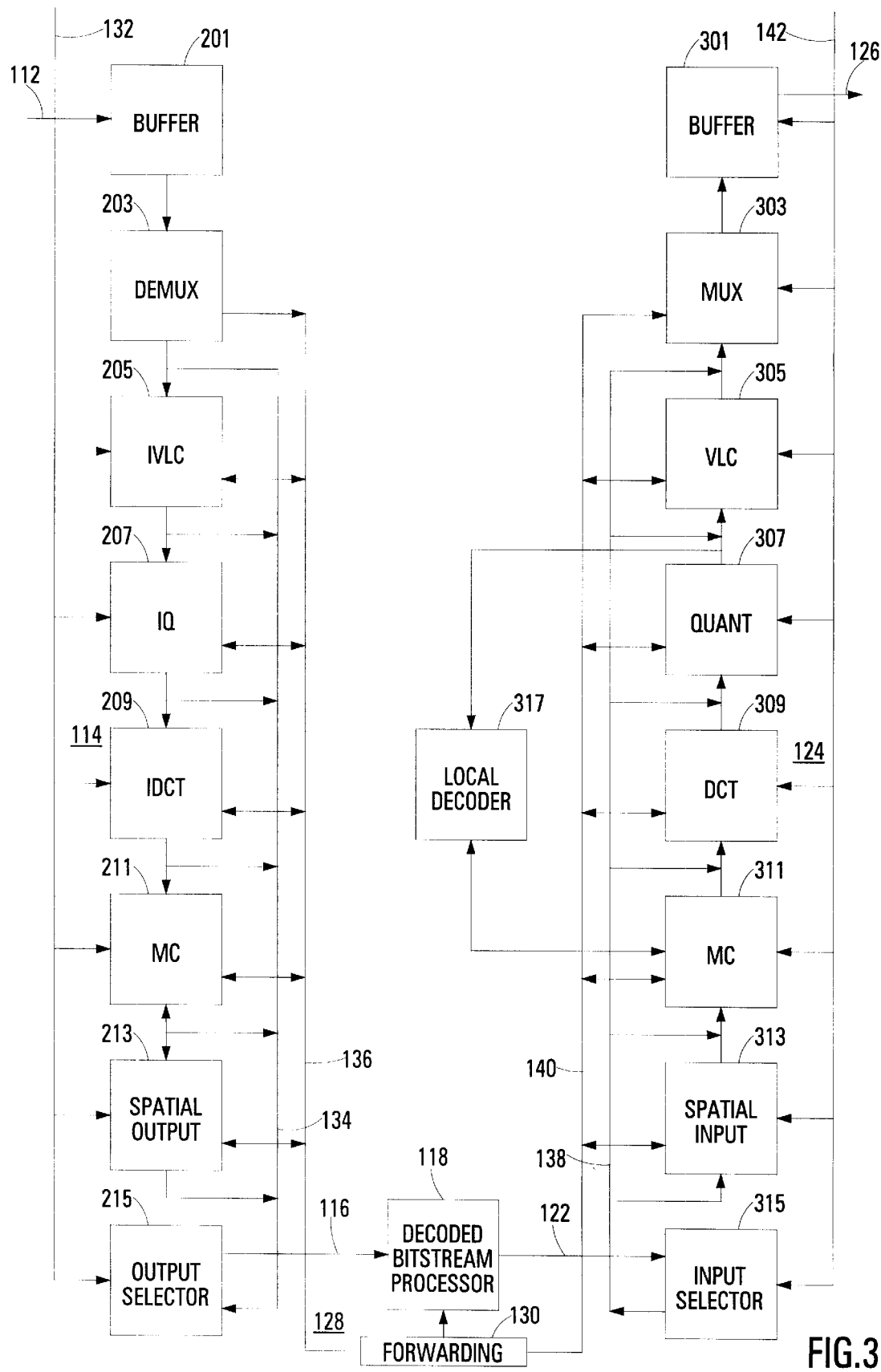
FIG. 3 is a block diagram showing part of the first embodiment of the apparatus according to the invention in more detail.
Figure 4:
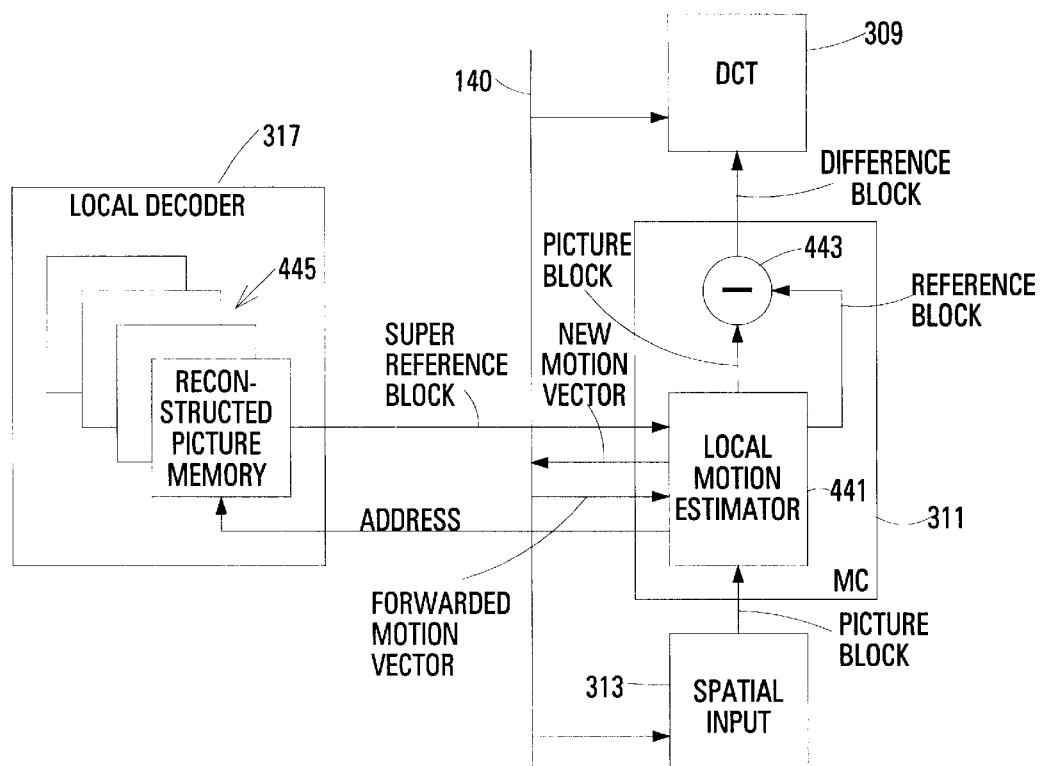
FIG. 4 is a block diagram that illustrates how bitstream parameters derived from the compressed input bitstream are re-used in the layered encoder in the apparatus according to the invention.

The layered encoder 124 will be described next, also with reference to FIGS. 2 and 3. A key feature of the layered encoder lies in that it re-encodes the modified bitstream 122 using the bitstream parameters derived from the compressed input bitstream by the layered decoder 114. Using the bitstream parameters in the layered encoder enables the layered encoder to re-encode the modified bitstream using fewer computational resources than if it generated the bitstream parameters anew. For example, re-encoding the modified bitstream using the motion vectors and DCT information derived from the compressed input bitstream can significantly reduce the computational resources required to perform many modifications to the bitstream characteristics of the compressed input bitstream. For example, such modifications of the bitstream characteristics as bit-rate conversion, decoder buffer size change, and picture size scaling can be performed. When such modifications of the bitstream characteristics are performed, the re-encoding can be performed using either the original motion vectors derived from the compressed input bitstream, or new motion vectors. The new motion vectors are generated using the original motion vectors as the starting points for a significantly simpler local search. The decision on whether to expend the additional computing resources required to generate new motion vectors involves a trade-off between the quality of the motion vectors and the additional computing resources required. When the original motion vectors are used to re-encode the modified bitstream after picture scaling, they must also be scaled in proportion to the picture scaling factor.

The layered encoder 124 can also re-encode the modified bitstream 122 using information relating to the DCT coefficients of the compressed input bitstream 112 as bitstream parameters. This provides both computational expediency and reduces the computational resources required to control the encoder buffer and output bit rate. For example, the DCT module of the layered encoder can use bitstream parameters that indicate the locations of the non-zero DCT coefficients in each block in the compressed input bitstream to improve the speed at which it computes the forward DCT. The DCT module need only compute the DCT coefficients for the non-zero locations indicated by the bitstream parameters. Furthermore, the quantizer of the layered encoder can use bitstream parameters that indicate the bit statistics of the DCT coefficients of the compressed input bitstream to control the quantizing factor "MQUANT."

The layered encoder 124 generates the compressed output bitstream 126 from the modified bitstream 122 output by the decoded bitstream processor 118. In the example shown in FIGS. 2 and 3, the compressed output bitstream is an MPEG-compliant video bitstream with a new set of user-specific MPEG header constraints defined by the processing selection module 120. However, the header information of the compressed output bitstream may or may not be the same as that of the compressed input bitstream 112 in all layers except the data layer. The layers include sequence, GOP, picture, slice, MB, and any extension header information.

It is important to understand the principal difference between layered encoder 124 and the decoded bitstream processor 118. Unlike the decoded bitstream processor, the layered encoder is only responsible for generating the compressed output bitstream 126 based on the user-specified header information and the modified bitstream 122 from the decoded bitstream processor 118. The layered encoder does not alter the video signal represented by the compressed output bitstream, except that the quantizer of the layered encoder may quantize the DCT coefficients differently from the way in which they were quantized in the compressed input bitstream.

The layered encoder 124 receives the modified bitstream 122 from the decoded bitstream processor 118, re-encodes the modified bitstream using bitstream parameters derived from the compressed input bitstream 112 by the layered decoder 114, and supplies the resulting compressed output bitstream 126 as the output of the compressed bitstream processing apparatus 100. The bitstream parameters are forwarded from the layered decoder to the layered encoder via the bitstream parameter forwarding path 128. The layered encoder re-encodes the modified bitstream only to the extent required by the compression state of the modified bitstream and the need to generate the compressed output bitstream 126 with the bitstream characteristics set by the encoder control data.

The layered encoder 124 operates according to encoding control data supplied by the processing selection block 120 via the control path 142. The encoding control data include header information for the compressed output bitstream 126. The encoding control data depend on processing selections input by the user (not shown) into the processing selector 120.

Like a conventional MPEG encoder, the layered encoder 124 includes a number of serially-connected encoding modules that operate together to encode the modified bitstream 122. Unlike a conventional MPEG encoder, the layered encoder can receive the modified bitstream in a partially-compressed state, and can use a subset of its encoding modules to encode the partially-compressed modified bitstream to the extent required to provide the compressed output bitstream with bitstream characteristics defined by the encoding control data.

The encoding control data supplied by the processing selection module 120 via the control path 142 determine the encoding module at which the layered encoder begins encoding. When the modified bitstream 122 is uncompressed, i.e., the modified bitstream is a conventional video bitstream having a pixel value for each pixel of each picture, the encoding control data set the layered encoder to encode the modified bitstream using all the encoding modules. However, when the decoded bitstream 116 processed by the decoded bitstream processor 118 was only partially decoded by the layered decoder 114, the modified bitstream is partially compressed, and is not a conventional video bitstream. In this case, the encoding control data select a subset of the encoding modules for the layered encoder to use to complete the encoding of the partially-compressed modified bitstream. For example, the decoded bitstream processor 118 may perform its processing on a decoded bitstream 116 composed of blocks of DCT coefficients. In this case, the modified bitstream 122 is also partially compressed, and the layered encoder encodes this modified bitstream by processing the blocks of DCT coefficients of the modified bitstream without using the spatial bitstream input module, the motion compensator, the DCT module, and the local decoder.

The encoding modules that constitute the layered encoder 124 are based on the corresponding modules of a conventional encoder. It is assumed that persons of ordinary skill in this art are familiar with the structure and operation of such conventional encoding modules, so the encoding modules will be described only briefly. The encoding modules constituting the layered encoder include the spatial bitstream input module 313, the motion compensator 311, the discrete cosine transform (DCT) module 309, the quantizer 307, the variable-length coder 305, the multiplexer 303, the encoder buffer 301 and the local decoder 317.

In addition to the above-mentioned encoding modules, the layered encoder 124 includes the input selector 315, the input bus 138 and the encoder bitstream parameter bus 140. The input selector has an input connected to the output of the decoded bitstream processor 118 through which it receives the modified bitstream 122. The input selector has an output connected to the input bus 138. The input bus is in turn connected to the input of each of the spatial bitstream input module 313, the motion compensator 311, the DCT module 309, the quantizer 307, the variable-length coder 305, and the multiplexer 303. The input selector has a control input connected to the control path 142 through which it receives the encoding control data. In response to the encoding control data, the input selector determines which of the spatial bitstream input module 313, the motion compensator 311, the DCT module 309, the quantizer 307, and the variable-length coder 305 is the first of the encoding modules that will process the modified bitstream. The input selector then connects the input of the first-to-process encoding module to the output of the decoded bitstream processor 118 via the input bus 138. For example, when the modified bitstream 122 from the decoded bitstream processor 118 is a conventional video bitstream in raster scan format and presentation order, the input selector 315 connects the output of the decoded bitstream processor 118 to the input of the spatial bitstream input module 313. The spatial bitstream input module can then convert the raster-scan and presentation-order format of the modified bitstream into macroblocks and blocks in coding order for processing by the remaining encoding modules of the layered encoder.

The encoder bitstream parameter bus 140 has inputs connected to the output of the bitstream parameter forwarding module 130 and outputs connected to an additional input on each of the encoding modules 303–313. The additional inputs connected to the encoder bitstream parameter bus enable the encoding modules to receive the bitstream parameters derived from the compressed input bitstream by the layered decoder 114 and forwarded via the bitstream parameter forwarding path 128.

In the layered encoder 124, the spatial input bitstream module 313 receives a conventional video bitstream in raster-scan format and presentation order, and converts the video bitstream into blocks and macroblocks in coding order suitable for processing by the remaining encoding modules of the layered encoder. The spatial input bitstream module feeds the resulting block-format video bitstream to the motion compensator 311.

The motion compensator 311 determines a motion vector for each macroblock of each picture that will be encoded as a P-picture or a B-picture. These pictures are the pictures that will not be independently encoded as I-pictures. Conventionally, the motion vector for each macroblock is determined by performing a block matching operation between the macroblock and reference blocks selected from one or more reference pictures. The reference pictures are usually reconstructed pictures obtained as a result of the local decoder 317 decoding the bitstream output by the quantizer 307. The reconstructed pictures are stored in a multi-page picture memory that forms part of the local decoder.

In a conventional encoder, the block matching operation to determine the motion vectors demands the most computational resources of any of the operations performed by the encoder. However, the computational requirements for determining the motion vectors in the compressed bitstream processing apparatus 100 are substantially reduced or even eliminated by re-using the motion vectors derived from the compressed input bitstream 112 by the layered decoder 114 and forwarded to the layered encoder via the bitstream parameter forwarding path 128.

The motion compensator 311 additionally processes the blocks of the pictures that will be encoded as P-pictures and B-pictures to generate difference blocks. The blocks subject to this processing will be called picture blocks to distinguish them from the reference blocks and the difference blocks. The difference block for each picture block is obtained by a subtraction operation performed between the picture block and a reference block. The reference block is the block of the reference picture indicated by the motion vector of the picture block.

The motion compensator 311 also passes encoding blocks to the DCT module 309. Encoding blocks are picture blocks if the picture is to be encoded as an I-picture, and are the difference blocks generated as just described if the picture is to be encoded as a P-picture or a B-picture.

The DCT module 309 receives the encoding blocks from the motion compensator 311 and orthogonally transforms each encoding block from the spatial domain to the frequency domain using a discrete cosine transform. The DCT module passes the resulting blocks of DCT coefficients to the quantizer 307.

The quantizer 307 receives the blocks of DCT coefficients from the DCT module 309 and quantizes each of the DCT coefficients in each block. The quantizing step-size is controlled by a buffer occupancy control signal (not shown) generated by the encoder buffer 301. The quantizing step size is controlled to ensure that the encoder buffer and a hypothetical standard video decoder buffer neither overflow nor underflow. The quantizer passes the resulting blocks of quantized DCT coefficients to the variable-length coder 305.

The variable-length coder 305 receives the blocks of quantized DCT coefficients from the quantizer 307 and applies variable-length coding to the quantized DCT coefficients in each block. The variable-length coder passes the resulting blocks of coded quantized DCT coefficients to the multiplexer 303 and to the local decoder 317.

The multiplexer 303 receives the blocks of coded quantized DCT coefficients from the variable-length coder 305, and additionally receives parameters such as motion vectors from the motion compensator 311, quantizing step size information from the quantizer 307, and run-length information from the variable-length coder 305, and combines these parameters to generate a picture-layer video bitstream. The multiplexer passes the resulting video bitstream picture-by-picture to the output buffer 301.

The output buffer 301 receives the video bitstream from the multiplexer 303 and generates the compressed output bitstream 126, a constant bit-rate bit stream. An additional multiplexer (not shown) may interleave the compressed output bitstream with other bitstreams, such as a compressed audio bitstream, and with additional header information, to generate a composite output bitstream.

The spatial bitstream input module 313, the motion compensator 311, the DCT module 309, the quantizer 307 and the variable-length coder 305 operate selectively in response to the encoding control data received from the processing selection module 120 via the control path 142. The encoding control data determine whether each of the above modules will actually operate. For example, if the user desires to perform spatial filtering on the compressed input bitstream, and the decoded bitstream processor is capable of performing such filtering on DCT coefficients, the encoding control data will enable the quantizer 307 and the variable-length coder 305 and will cause the input selector 315 to connect the partially-compressed modified bitstream 122 from the decoded bitstream processor 118 to the input of the quantizer 307. The encoding control data will also deactivate the encoding modules upstream of the encoding module that receives the modified bitstream, i.e., the DCT module 309, the motion compensator 311, the spatial bitstream input module 313 and the local decoder 317. Deactivating the unused encoding modules frees computational resources that would otherwise be used to provide these modules to be used for other purposes.

It should be noted that when the compressed bitstream processing apparatus according to the invention is embodied in a computer or digital signal processor, the computer or digital signal processor may lack such elements as the input bus 138 and the encoder bitstream parameter bus 140. In this case, the input selector 315 may communicate the addresses at which the decoded bitstream processor 118 stored the modified bitstream 122 to the first of the encoding modules to process the modified bitstream. This encoding module will then fetch the modified bitstream from these addresses. Similarly, the bitstream parameter forwarding module 130 may communicate to the layered encoder 124 the addresses at which the bitstream parameters derived from the compressed input bitstream 112 by the layered decoder 114 are stored. The layered encoder can then fetch the bitstream parameters stored at these addresses to use them in connection with encoding the modified bitstream. It should also be noted that, in computer-based and DSP-based embodiments, the encoding modules may be ephemeral, and the apparatus will lack elements corresponding to the encoding modules that are not used to encode the modified bitstream 122.

Some of the ways in which the bitstream parameters derived from the compressed input bitstream 112 by the layered decoder 114 can be used will now be described. In a first example, the bitstream parameters derived from the compressed input bitstream are forwarded to the decoded bitstream processor 118 where they are used to simplify the processing performed by the decoded bitstream processor. The bitstream parameters are color data indicating the color characteristics of the video signal represented by the compressed input bitstream. Such color data are included in the picture headers derived from the compressed input bitstream by the demultiplexer 203. The demultiplexer forwards the color data to the decoded bitstream processor 118 via the bitstream parameter forwarding path 128. The decoded bitstream processor then uses the color data to determine whether it needs to apply color correction to the decoded bitstream 116. If the decoded bitstream processor determines that color correction is needed, it may additionally use the color data to design an appropriate color calibration scheme.

The layered decoder 114 decodes the compressed input bitstream 112 to generate the decoded bitstream 116 in a compression state suitable for processing by the decoded bitstream processor 118. The decoded bitstream processor then applies color correction to the decoded bitstream using the color calibration scheme it has derived from the color data derived from the compressed input bitstream. The layered encoder 124 then re-encodes the modified bitstream 122 generated by the decoded bitstream processor 118 to generate the compressed output bitstream 126. The video signal represented by the compressed output bitstream is color corrected relative to that represented by the compressed input bitstream. Additional bitstream parameters derived from the compressed input bitstream 112 may be used by the layered encoder to simplify the encoding processing required to re-encode the modified bitstream 122, as will be described below.

As noted above, in conventional MPEG compression, the motion estimation operation of the encoding process requires the most computational resources. Motion estimation is conventionally performed using a motion compensator module located in the encoder in a position corresponding to that of the motion compensator 311 in the layered encoder 124. Consequently, eliminating or substantially simplifying the motion estimation operation can achieve substantial savings in the computational resources required by the layered encoder 124.

The motion compensator 311 can be completely disabled if the decoded bitstream processor 118 can perform the processing operations selected by the user using the DCT coefficients derived from the compressed input bitstream 112 by the layered decoder 114. This provides a substantial reduction in the computational resources demanded by the layered encoder. However, if the processing operation performed by the decoded bitstream processor 118 requires that the layered decoder fully decode the compressed input bitstream to provide a conventional video bitstream as the decoded bitstream 116, then the modified bitstream 122 is a conventional video bitstream that has to be filly re-encoded.

The compressed bitstream processing apparatus 100 provides a number of ways of reducing the computational resources required to re-encode the modified bitstream when the modified bitstream is a conventional video bitstream. The bitstream parameter forwarding path 128 forwards the motion vectors derived from the compressed input bitstream 112 to the layered encoder 124. The layered encoder can then use these motion vectors as the motion vectors in the motion compensation operations performed by the motion compensator 311. This provides a significant reduction in the computational resources required by the layered encoder 124, since no motion estimation operations are performed. Re-using the motion vectors derived from the compressed input bitstream constrains the performance of the motion estimation in the layered encoder to be no better than that originally used to encode the compressed input bitstream. However, this is not usually a significant drawback since most hardware or software encoders employ an effective although efficient motion estimation algorithm.

Simply re-using the motion vectors derived from the compressed input bitstream 112 will produce an acceptable motion estimation accuracy, but a better motion estimation accuracy is obtained by using the motion vectors derived from the compressed input bitstream as full-pixel motion vectors, and performing an additional half-pixel search relative to the full-pixel motion vectors to produce the final motion estimation. This alternative demands more computational resources than re-using the motion vectors derived from the original compressed input bitstream. However, it produces a better picture quality and a better compression efficiency. Moreover, since the scope of the motion estimation search is considerably less than that used in conventional motion estimation, the additional computing resources required are substantially less than those required for conventional motion estimation.

An example of the structure of the motion compensator 311 that performs local motion estimation is shown in FIG.

4. The motion compensator includes the local motion estimator 441 and the subtractor 443. The local motion estimator has inputs connected to the outputs of the spatial bitstream input module 313, the encoder bitstream parameter bus 140, and the local decoder 317. The local motion estimator has outputs connected to the reconstructed picture memory 445 in the local decoder, the encoder bitstream parameter bus and both inputs of the subtractor 443.

The local motion estimator 441 receives successive picture blocks from the spatial bitstream input module 313 and performs a motion estimation operation on each of them. The picture block that is the subject of the current motion estimation operation will be called the current picture block. The local motion estimator also receives the motion vector for the current picture block from the encoder bitstream parameter bus 140. This motion vector was derived from the compressed input bitstream 112 as a bitstream parameter, and was forwarded via the bitstream parameter forwarding path 128 (FIG. 2). The local motion estimator derives an address from the forwarded motion vector for the current picture block, and supplies this address to the picture memory 445 of the local decoder 317. In response, the picture memory feeds a super reference block back to the local motion estimator. The super reference block is a block of a reconstructed picture stored at the location in the picture memory designated by the address, and is two pixels larger than a conventional picture block in both the horizontal and vertical directions. The larger size of the super reference block enables matching blocks having a half-pixel precision to be generated from the super reference block.

The local motion estimator 441 performs interpolation operations between adjacent pixel values in the super reference block to generate a set of eight 8×8 pixel matching blocks. Each matching block is displaced relative to the center of the super matching block in a different one of the directions N, NE, E, SE, S, SW, W, NW by a distance equivalent to one half of the distance between adjacent pixels in the super reference block. The local motion estimator also generates a ninth matching block by selecting an 8×8 pixel picture block-sized subset centered in the 10×10 pixel super reference block.

The local motion estimator 441 then performs a block matching operation between the current picture block and the nine matching blocks to determine which matching block most closely matches the current picture block. This matching block will be called the closest matching block. The local motion estimator then adds the displacement of the closest matching block relative to the forwarded motion vector to the forwarded motion vector to generate a new motion vector with half-pixel precision for the current picture block. The local motion estimator also adopts the closest matching block as the reference block for the current picture block.

The local motion estimator 441 feeds the new motion vector with half-pixel precision to the encoder bitstream parameter bus 140 for forwarding to the encoder buffer 301, and feeds the current picture block and its reference block to the inputs of the subtractor 443. The subtractor 443 performs a pixel-by-pixel subtraction of the reference block from the current picture block, and feeds the resulting difference block to the DCT module 409.

Bitstream parameters derived from the compressed input bitstream 112 may also be used to reduce the computational requirements of the bit rate control performed by the layered encoder 124. Bit rate control plays an important role in achieving good video quality and helps ensure that the compressed output bitstream 126 can be decoded in real time by a practical decoder. Bit rate control controls the number of bits allocated to encode each picture. The number of bits allocated to encode each picture must not only quantize all the DCT coefficients in the picture with a sufficient number of quantizing levels to achieve an acceptable presentation quality, but must also satisfy the buffer overflow and underflow constraints defined by the MPEG standard.

The compressed input bitstream 112 contains bitstream parameters indicating the characteristics of each macroblock. The layered decoder 114 can derive such bitstream parameters from the compressed input bitstream, and pass them to the layered encoder 124 where they are re-used to assist in performing the adaptive bit allocation. Examples of two different approaches to re-allocating bits to the DCT coefficients of each macroblock will be described with reference to FIGS. 3, 5 and 6.

Figure 5:
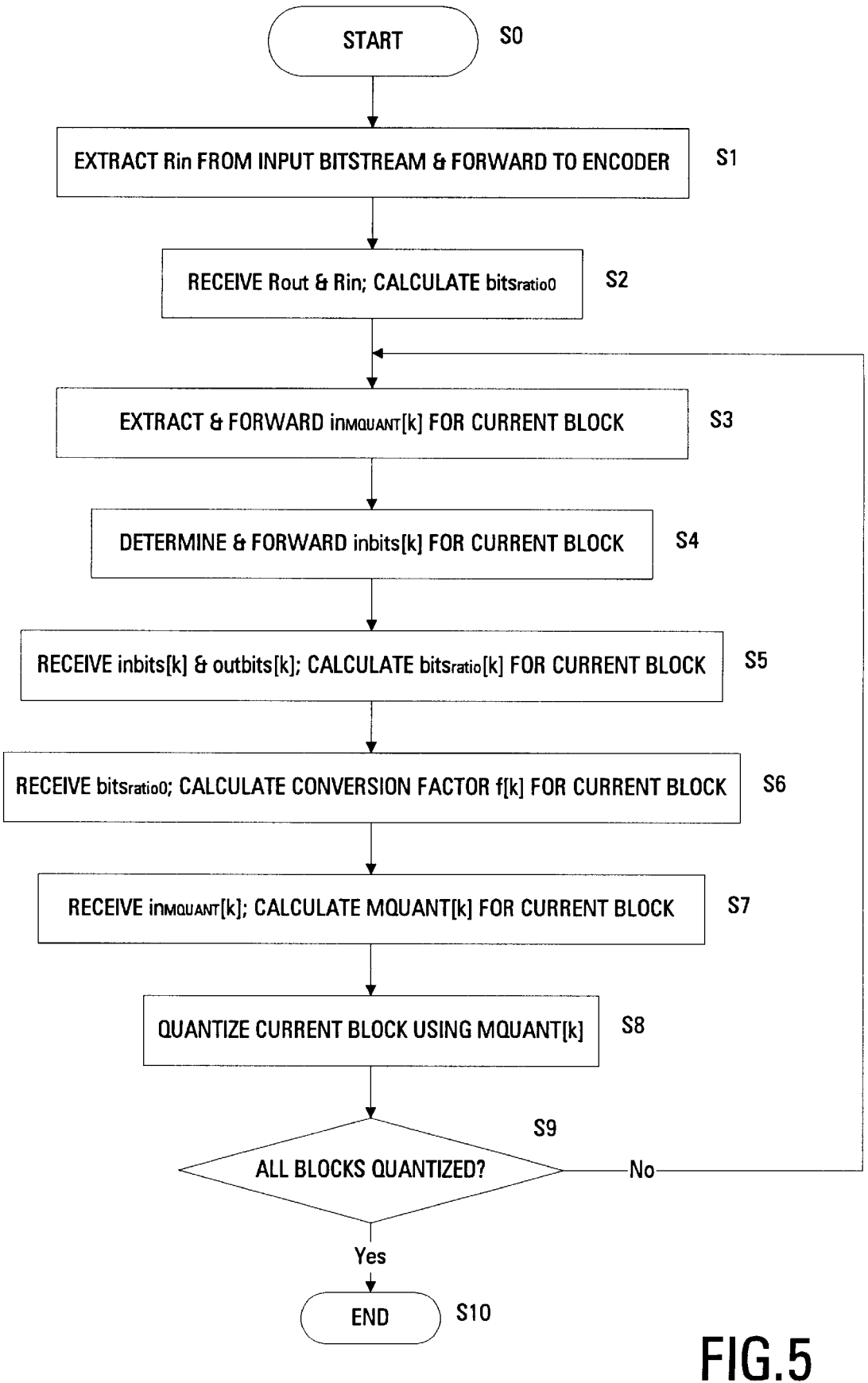
FIG. 5 is a flow chart that illustrates a first way in which quantizing is performed in the layered encoder by re-using quantizing parameters derived from the compressed input bitstream.

In the first approach, illustrated in FIG. 5, the layered decoder 114 derives the quantizing step size $in_{MQUANT}[k]$ from the compressed input bitstream 112. The quantizing step size $in_{MQUANT}[k]$ is the quantizing step size of the current macroblock k in the compressed input bitstream. The layered decoder passes the quantizing step size to the layered encoder as a bitstream parameter. The quantizing step size is also passed to the inverse quantizer 207, which performs an inverse quantizing operation on the DCT coefficients in the current macroblock k using this quantizing step size. Then, in the layered encoder 124, the quantizer 307 calculates a new quantizing step size MQUANT[k] for quantizing the DCT coefficients of the current macroblock k and re-quantizes the DCT coefficients of the current macroblock k with the new quantizing step size. The quantizer calculates the new quantizing step size MQUANT[k] using the quantizing step size for the current macroblock k forwarded from the compressed input bitstream.

Figure 6:
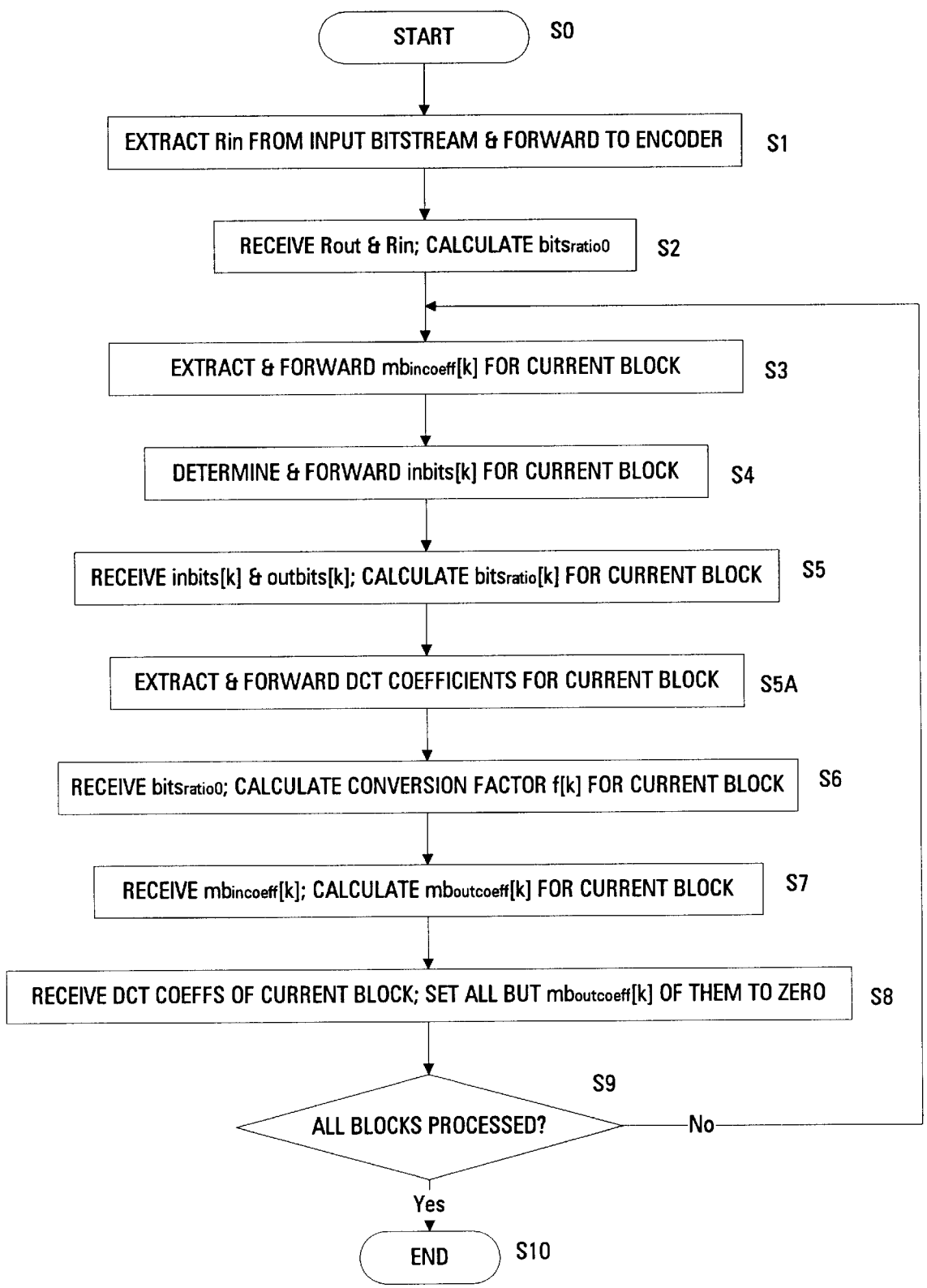
FIG. 6 is a flow chart that illustrates a second way in which quantizing is performed in the layered encoder by re-using quantizing parameters derived from the compressed input bitstream.

In the second approach, illustrated in FIG. 6, the quantized DCT coefficients for the current macroblock k are derived from the compressed input bitstream by the inverse variable-length coder 205 and forwarded through the bitstream parameter forwarding path 128 from the layered decoder 114 to the quantizer 307 of the layered encoder 124. Also, the bitstream parameter $mb_{incoeff}[k]$ indicating the number of non-zero DCT coefficients in the current macroblock is derived from the compressed input bitstream and forwarded from the layered decoder to the quantizer in the layered encoder. Using the bitstream parameter $mb_{incoeff}[k]$, the quantizer then performs an operation that nulls out selected ones of the non-zero quantized DCT coefficients such that the compressed output bitstream meets the above-mentioned buffer constrains.

Nulling out selected non-zero quantized DCT coefficients in the second approach demands fewer computational resources than the first approach because inverse quantizing and re-quantizing are not performed. However, the first approach will usually provide a better presentation quality.

The computational resources required by the first approach are reduced by using bitstream parameters derived from the compressed input bitstream to enable the adaptive bit allocation of the compressed input bitstream to assist in controlling the bit rate of the compressed output bitstream. The processing performed in the first approach is illustrated in FIG. 5. In the following description, the block of DCT coefficients that is the subject of the current quantizing operation will be called the current block, and the picture of which the current block forms part will be called the current picture.

At the start of encoding, steps S1 and S2 are performed. In step S1, the layered decoder 114 derives the bitstream parameter $R_{in}$ from the compressed input bitstream 112 and forwards this bitstream parameter to the quantizer 307 via the bitstream parameter forwarding path 128. The bitstream parameter $R_{in}$ indicates the bit rate of the compressed input bitstream. In step S2, the quantizer 307 in the layered encoder 124 receives the bitstream parameter $R_{in}$, from the encoder bitstream parameter bus 140, and receives the parameter $R_{out}$ from the processing selection module 120. The quantizer then determines the ratio $bits_{ratio0}$ by dividing $R_{out}$ by $R_{in}$.

In step S3, the inverse variable-length coder 203 derives the bitstream parameter $in_{MQUANT}[k]$ from each macroblock in the compressed input bit stream 112. The bitstream parameter $in_{MQUANT}[k]$ of the current macroblock k of the compressed input bitstream indicates the quantizing step size that was used to quantize the DCT coefficients of the current macroblock k. The inverse variable-length coder forwards the bitstream parameter $in_{MQUANT}[k]$ to the quantizer 307 in the layered encoder 124.

In step S4, the inverse variable-length coder 203 derives the bitstream parameter inbits[k] for the current macroblock k by counting the number of bits in the compressed input bitstream used to represent the DCT coefficients of the current picture prior to the DCT coefficients of the current macroblock k. The inverse variable-length coder forwards the bitstream parameter inbits[k] to the quantizer 307 in the layered encoder 124.

In steps S5–S8, the quantizer 307 in the layered encoder 124 uses the bitstream parameters forwarded by the layered decoder 114 to quantize the DCT coefficients in the current macroblock with a quantizing step size that enables the bit rate of the compressed output bitstream 126 to comply with the above-mentioned buffer constraints. The variable-length coder 305 includes a counter that counts outbits[k], the number of bits of the compressed output bitstream used to represent the DCT coefficients of the current picture prior to the DCT coefficients of the current macroblock k. The variable-length coder feeds each value of outbits[k] back to the quantizer. Finally, the quantizer receives encoding control data via the control path 142.

In step S5, the quantizer determines the ratio $bits_{ratio}[k]$ by determining the ratio between outbits[k] and inbits[k], i.e.:

$bits_{ratio}[k]$=outbits[k]inbits[k]

In step S6, the quantizer 307 determines the conversion factor f[k] for the current macroblock k. The quantizer calculates the conversion factor from the ratios $bits_{ratio}[k]$ and $bits_{ratio0}$ using the following equation:

$$f[k] = \frac{2 \times bits_{ratio}[k] + bits_{ratio0}}{bits_{ratio}[k] + 2 \times bits_{ratio0}}$$

where $0.7 \leq f[k] \leq 1.3$.

In step S7, the quantizer 307 calculates the value of MQUANT[k] for the current macroblock k. The value of MQUANT[k] is the quantizing step size that the quantizer will use to quantize the DCT coefficients of the current macroblock k. The quantizer calculates the value of MQUANT[k] for the current macroblock k by multiplying the value of the bitstream parameter $in_{MQUANT}[k]$ by the conversion factor f[k], i.e.:

MQUANT[k]=$in_{MQUANT}[k] \times f[k]$.

In step S8, the quantizer 307 quantizes all the non-zero DCT coefficients in the current macroblock k using the quantizing step size MQUANT[k].

In step S9, the quantizer determines whether all the macroblocks in the current bitstream have been quantized. If so, processing proceeds to step S10, where it ends. Otherwise, processing returns to step S3 and the process of calculating the ratio $bits_{ratio}[k]$, the conversion factor f[k] and the quantizing step size MQUANT[k] for the next macroblock k, and quantizing the DCT coefficients of the next macroblock using the quantizing step size MQUANT [k] is repeated until the picture is completely coded, and until the entire compressed input bitstream has been processed.

The computational resources required for the second approach are also reduced by using bitstream parameters derived from the compressed input bitstream to enable the adaptive bit allocation of the compressed input bitstream to assist in controlling the bit rate of the compressed output bitstream. The processing performed in the second approach is illustrated in FIG. 6. Steps S1, S2, S4–S6, and S9 are the same as in the first approach described above with reference to FIG. 5, and will not be described again here.

In step S3, the layered decoder 114 derives the bitstream parameter $mb_{incoeff}[k]$ from each macroblock of the compressed input bitstream 112 and forwards this bitstream parameter to the quantizer 307 in the layered encoder 124 via the bitstream parameter forwarding path 128. The bitstream parameter $mb_{incoeff}[k]$ indicates the number of non-zero DCT coefficients in the current macroblock k of the compressed input bitstream.

In step S5A, the layered decoder 114 forwards the quantized DCT coefficients derived from the compressed input bitstream 112 by the inverse variable-length coder 205 to the quantizer 307 via the bitstream parameter forwarding path 128.

In step S7, the quantizer 307 in the layered encoder 124 uses the bitstream parameter $mb_{incoeff}[k]$ to determine the number of the quantized DCT coefficients received from the layered decoder that will be set to zero to control the bit rate of the compressed output bitstream. The quantizer calculates the value of $mb_{outcoeff}[k]$ for the current macroblock k. The value of $mb_{outcoeff}[k]$ is the number of DCT coefficients in the macroblock k that may have a value other than zero. To calculate the value of $mb_{outcoeff}[k]$ for the current macroblock k, the quantizer multiplies the value of the bitstream parameter $mb_{incoeff}[k]$ by the value of the conversion factor f[k] calculated in step S6, i.e., $mb_{outcoeff}[k]=mb_{incoeff}[k] \times f[k]$.

In step S8, the quantizer 307 receives all the quantized DCT coefficients of the current macroblock k from the inverse variable-length coder 205, and sets to zero all but the number of them indicated by the value of $mb_{outcoeff}[k]$.

In the embodiment just described, the compressed input signal and the compressed output signal were both MPEG-compliant bitstreams. An example of a second embodiment 700 of a compressed bitstream processing apparatus according to the invention will now be described with reference to FIGS. 7A and 7B. This embodiment operates on a compressed input bitstream in any compression state, generates the compressed output bitstream in any compression state, and allows multiple processors operating on bitstreams having different compression states to be concatenated. In the example to be described, the compressed bitstream processing apparatus processes a compressed input bitstream representing a video signal.

The compressed bitstream processing apparatus 700 is composed of four basic units, the first compression state translation unit 714, the final compression state translation unit 724, the processor 718A, and the bitstream parameter forwarding path 728 that includes the bitstream parameter forwarding module 730. If the compressed bitstream processing apparatus is designed to allow a user to select or define the processing operation performed, the apparatus additionally includes the processing selection module 720 that receives instructions from the user and controls the processing performed by the compression state translation units and the processor. Otherwise, the processing selection module controls the processing performed by the compression state translation units and the processor so that the compressed bitstream processing apparatus performs a predetermined processing operation on the compressed input bitstream.

Figure 7A:
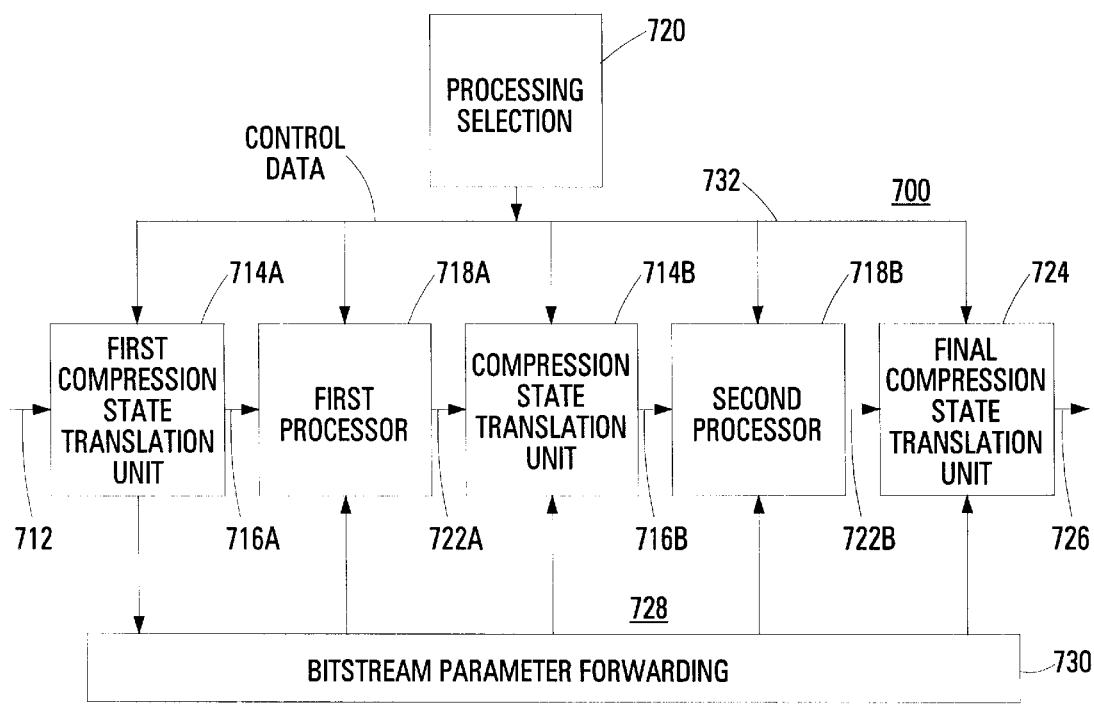
FIG. 7A is a block diagram of a second embodiment of an apparatus according to the invention for processing a compressed input bitstream.

The example shown in FIG. 7A includes two optional additional units, the compression state translation unit 714B and the second processor 718B. These additional units provide the compressed bitstream apparatus 700 with the capability to process the information signal represented by the compressed input bitstream in two different ways, a first way performed by the first processor 718A and a second way performed by the processor 718B. The compression state translation unit 714B precedes the optional second processor 718B, and the two units are interposed between the first processor 718A and the final compression state translation unit 724. The compression state translation unit 714B and the second processor are also connected to the bitstream parameter forwarding path 728 and are controlled by the processing selection unit 720.

Preceding the second processor 718B with the compression state translation unit 714B enables the second processor to operate on a bitstream having a different compression state from the bitstream output by the first processor 718A. Optionally, more than one additional processor, each preceded by a compression state translation unit, may be interposed between the first processor 718A and the final compression state translation unit 724.

In the example shown in FIG. 7A, the video signal represented by the compressed input bitstream 712 is subject to two different processing operations, one performed by the first processor 718A and the other performed by the second processor 718B. The first processor is preceded by the compression state translation unit 714A, which changes the compression state of the compressed input bitstream to generate the output bitstream 716A in the compression state required by the first processor. The first compression state translation unit enables the compressed input bitstream 712 to have a compression state that differs from that required by the first processor.

The first processor 718A processes the output bitstream 716A generated by the compression state translation unit 714A to generate the modified bitstream 722A. The first processor modifies the video signal represented by the output bitstream 716A, but does not change the compression state of the output bitstream. Consequently, the compression state of the modified bitstream 722A is the same as that of the output bitstream 716A. Optionally, the first processor 714A may be composed of multiple concatenated processors, all of which operate on bitstreams in the same compression state.

The second processor 718B is preceded by the compression state translation unit 714B, which changes the compression state of the modified bitstream 722A to generate the output bitstream 716B in the compression state required by the second processor. The compression state translation unit 714B enables the second processor to be concatenated with the first processor 718A, even though the processors operate on input bitstreams having differing compression states.

The second processor 718B processes the output bitstream 716B generated by the compression state translation unit 714B to generate the modified bitstream 722B. The second processor modifies the video signal represented by the output bitstream 716B, but does not change the compression state of the output bitstream. Consequently, the compression state of the modified bitstream 722B is the same as that of the output bitstream 716B. Optionally, the second processor may also be composed of multiple concatenated processors, all of which operate on bitstreams in the same compression state.

The second processor 718B is followed by the final compression state translation unit 724, which changes the compression state of the modified bitstream 722B to generate the compressed output signal 726. This enables the compressed bitstream processing apparatus 700 to deliver the compressed output signal in the desired compression state. The final compression state translation unit may also change the bitstream characteristics, e.g., bit rate, buffer size, etc., of the modified bitstream to generate the compressed output bitstream with the desired bitstream characteristics. The compression state and bitstream characteristics of the compressed output signal may be the same as, or different from, that of the compressed input bitstream 712.

Figure 7B:
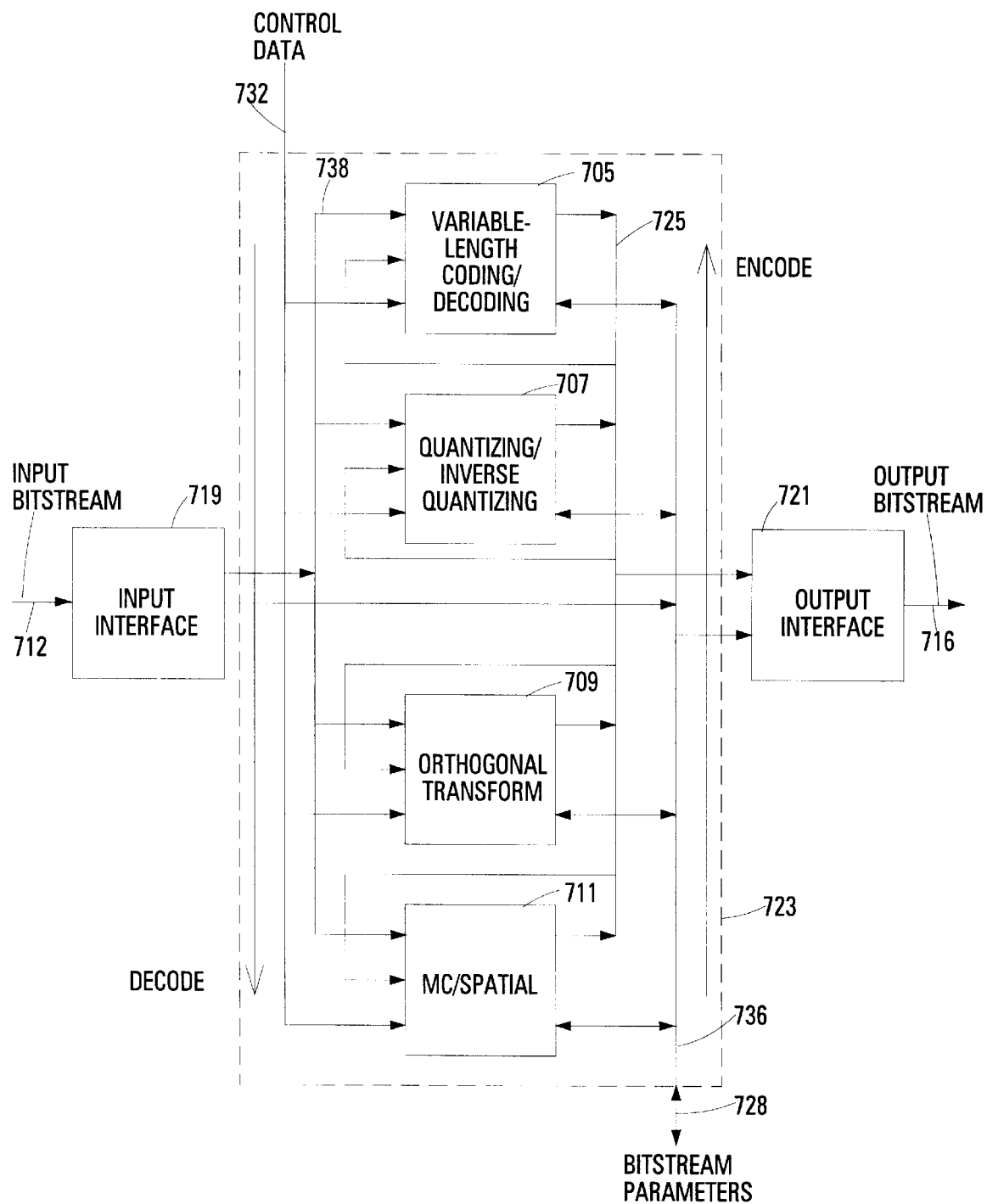
FIG. 7B is a block diagram showing details of the compression state translation units of the second embodiment of the apparatus according to the invention.

FIG. 7B shows details of the compression state translation unit 714 having the same structure and operation as the compression state translation units 714A, 714B and 724 of the embodiment shown in FIG. 7A. The compression state translation unit 714 receives the input bitstream 712 in a first compression state, selectively changes the compression state of the input bitstream to generate the output bitstream 716 having a different compression state from the input bitstream. The compression state of the output bitstream may be greater than or less than that of the input bitstream, i.e., the compression state translation unit 714 may operate in an encoding mode or a decoding mode, depending on the control data received via the control path 732.

The compression state translation unit 714 is composed of three main modules, the input interface 719, the output interface 721, and the layered encoding/decoding modules 723. The layered encoding/decoding modules are composed of an encoding/decoding module corresponding to each compression state of the compressed input bitstream. In the example shown, the layered encoding modules are the variable length coding/decoding module 705, the quantizing/inverse quantizing module 707, the orthogonal transform module 709 and the motion compensation/spatial processing module 711.

The input interface module 719 includes buffering and demultiplexing elements (not shown) that derive bitstream parameters from the input bitstream 712. The input interface module selectively feeds the bitstream parameters to those of the layered encoding/decoding modules 723 that require them via the input bus 738. The input bus enables the input interface module to feed bitstream parameters to any of the encoding/decoding modules. The control data received via the control path 732 determine which of the encoding/decoding modules receive the bitstream parameters from the input bus.

The input interface module 719 also feeds the bitstream parameters to the bitstream parameter forwarding bus 736 for forwarding to the processors 718A and 718B and to other compression state translation units via the bitstream parameter forwarding path 728. The control data received via the control path 732 determine which of the bitstream parameters are fed to the bitstream parameter forwarding bus 736.

The bitstreams generated by the layered encoding/decoding modules 723 are fed to the data output bus 725. These bitstreams are composed of such data elements as pixel values, motion vectors, coded, quantized DCT coefficients, etc. The data output bus transfers these bitstreams to an encoding/decoding module of a higher or lower layer, and also to the output interface module 721.

The output interface module 721 includes multiplexing and buffering elements (not shown) that construct the output bitstream 716 from the bitstreams generated by one or more of the layered encoding/decoding modules 723. The output interface module can select the bitstream output by any of the encoding/decoding modules for inclusion in the output bitstream. The output interface module selects the encoding/decoding modules from to receive a bitstream for inclusion in the output bitstream in response to the control data received via the control path 732.

The layered encoding/decoding modules 723 are all dual-function modules. Each of the modules is capable of operating in an encoding mode or in a decoding mode, depending on the control data received via the control path 732. For example, when the control data set the orthogonal transform module 709 to its encoding mode, this module performs both forward and reverse discrete cosine transforms, the inverse transforms being required to provide part of the local decoding function of an encoder. When the control data set the orthogonal transform module to its decoding mode, this module only performs inverse discrete cosine transforms.

The control data received via the control path 732 also select the encoding/decoding modules required to provide the compression state translation unit with its desired compression state translation characteristic. The control data may select all of the encoding/decoding modules, or a subset of the encoding/decoding modules, depending on the compression states of the input and output bitstreams.

In a computer- or DSP-based compressed bitstream processing apparatus, the control data received via the control path 732 also determine the allocation of computational resources to each of the layered encoding/decoding modules 723. The compression state translation unit performs a partial encoding or decoding operation using a subset of the layered encoding/decoding modules. Normally, in this case, no computational resources are allocated to the remaining, unused encoding/decoding modules.

Each of the encoding/decoding modules 723 operates on a bitstream output by either the input interface module 719 or the encoding/decoding module in at least one higher or lower processing layer. Each of the encoding/decoding modules outputs a bitstream to the output interface module 721 or to the encoding/decoding module in at least one higher or lower processing layer. The bitstream routing among the encoding/decoding modules and between the input and output interface modules 719 and 721 and the encoding/decoding modules is determined by the control data received via the control path 732. Whether a bitstream is output to a encoding/decoding module in a higher layer or a lower layer depends on whether the compression state translation unit is operating in its encode mode or its decode mode, respectively.

In addition, the layered encoding/decoding modules 723 may operate using bitstream parameters received via the bitstream parameter forwarding path 728, and the layered encoding/decoding modules may additionally or alternatively derive bitstream parameters from the compressed input bitstream and forward such bitstream parameters to the other compression state translation units and the processors via the bitstream parameter forwarding path 728.

A first practical example of a compression state translation unit will now be described. In this example, the compression state translation unit is the first compression state translation unit 714A of a compressed bitstream processing apparatus in which the first processor 718A operates on a partially-compressed bitstream composed of DCT coefficients. In this example, the input bitstream 712 of the first compression state translation unit is an MPEG bitstream, and the first compression state translation unit operates to decode the MPEG bitstream to the compression state required by the first processor.

Control data received via the control path 732 cause the compression state translation unit 714A to operate in the following way: the variable-length coding/decoding module 705 operates in its variable-length decoding mode, the quantizing/inverse quantizing module 707 operates in its inverse quantizing mode and the remaining encoding/decoding modules are disabled. No computational resources are allocated to the disabled encoding/decoding modules.

The input interface module 719 derives coded, quantized DCT coefficients, quantizing tables, motion vectors, picture headers and other bitstream parameters from the input bitstream 712. Using the input bus 738, the input interface module feeds the DCT coefficients to the variable-length decoding module 705, the quantizing tables to the inverse quantizing module 707, and the motion vectors and picture headers to the output interface module 721. Using the bitstream parameter forwarding bus 736, the input interface module also feeds the quantizing tables, motion vectors, picture headers and other bitstream parameters derived from the input bitstream to the bitstream parameter forwarding path 728 and to the output interface module 721.

The output interface module 721 receives via the output bus 725 the bitstream of DCT coefficients output by the inverse quantizing module 707. The output interface module receives via the forwarded bitstream parameter bus 736 a bitstream composed of the respective picture headers and motion vectors from the input interface module 719. The output interface module forms the output bitstream 716 from the DCT coefficients and the respective picture headers and motion vectors.

The bitstream parameters derived from the input bitstream 712 by the first compression state translation unit 714A are forwarded via the bitstream forwarding path 728 to the first and second processors 718A and 718B for use in processing the output bitstream generated by the compression state translation unit 714A. The bitstream parameters are also forwarded via the bitstream forwarding path 728 to the compression state translation units 714B and 724 for possible use in re-encoding the modified bitstreams generated by the first and second processors.

A second practical example of a compression state translation unit will now be described. In this example, the compression state translation unit is again the first compression state translation unit 714A of a compressed bitstream processing apparatus 700 in which the first processor 718A operates on a partially-compressed bitstream composed of DCT coefficients. In this second example, the input bitstream 712 is a partially compressed bitstream composed of pictures in coding order, and in which each picture is composed of a set of encoding blocks. Encoding blocks are picture blocks composed of a pixel value for each pixel when the picture is a I-picture, and are difference blocks composed of a difference value for each pixel when the picture is a P- or B-picture. In the latter case, each encoding block has a respective motion vector. The compression state translation unit operates 714A to encode the partially-compressed input bitstream to change the compression state of the input bitstream to that required by the first processor.

Control data received via the control path 732 cause the compression state translation unit 714A to operate in the following way: the orthogonal transform module 709 operates in its forward transform mode, and the remaining encoding/decoding modules are disabled. No computational resources are allocated to the disabled encoding/decoding modules.

The input interface module 719 derives the encoding blocks, motion vectors and other bitstream parameters from the input bitstream. Using the input bus 725, the input interface module feeds the encoding blocks to the orthogonal transform module 709. The input interface module also feeds the motion vectors and other bitstream parameters derived from the input bitstream to the bitstream parameter forwarding bus 736 for forwarding to the bitstream parameter forwarding path 728 and to the output interface module 721.

The output interface module 721 receives via the output bus 725 the bitstream of DCT coefficients output by the orthogonal transform module 709. The output interface module also receives via the bitstream parameter forwarding bus a bitstream composed of the respective motion vectors for the DCT coefficients from the input interface module 719. The output interface module forms the output bitstream 716 from the DCT coefficients and respective motion vectors.

Again, the bitstream parameters derived from the input bitstream 712 by the first compression state translation unit 714A are forwarded via the bitstream forwarding path 728 to the first and second processors 718A and 718B for use in processing the output bitstream generated by the compression state translation unit 714A. The bitstream parameters are also forwarded via the bitstream forwarding path 728 to the compression state translation units 714B and 724 for possible use in further changing the compression state of the modified bitstreams generated by the first and second processors.

In both examples just described, forwarding the bitstream parameters from the first compression state translation unit 714A saves the compression state translation units 714B and 724 from expending computational resources to generate new parameters equivalent to the bitstream parameters forwarded by the compression state translation unit 714A. Consequently, the compressed bitstream processing apparatus 700 according to the invention can perform the desired processing of the compressed input bitstream using a smaller scale of hardware or a less powerful computer or digital signal processor than a conventional compressed information signal processing apparatus. Alternatively, compared with a conventional processing apparatus, the compressed bitstream processing apparatus 700 can perform the desired processing at a faster rate, e.g., faster than real-time, using given hardware or a given computer.

Although this disclosure describes illustrative embodiments of the invention in detail, it is to be understood that the invention is not limited to the precise embodiments described, and that various modifications may be practiced within the scope of the invention defined by the appended claims.

I claim:

1. Apparatus for processing a compressed input bitstream representing an information signal, the apparatus comprising:

a layered decoder that decodes the compressed input bitstream to provide a decoded bitstream, the layered decoder including serially-connected decoding modules, each having an output;

a decoded bitstream processor that processes the decoded bitstream in a way that modifies the information signal to provide a modified bitstream, the decoded bitstream processor having an input and an output;

a layered encoder that re-encodes the modified bitstream to provide a compressed output bitstream, the layered encoder including serially-connected encoding modules, each of the encoding modules having an input, each of the encoding modules corresponding to one of the decoding modules of the layered decoder; and a selective interconnection path that selectively connects the output of one of the decoding modules to the input of the decoded bitstream processor and that selectively connects the output of the decoded bitstream processor to the input of one of the encoding modules, the one of the encoding modules corresponding to the one of the decoding modules.

2. The apparatus of claim 1, additionally comprising means for deactivating the decoding modules downstream of the one of the decoding modules, and for deactivating the encoding modules upstream of the one of the encoding modules.

3. The apparatus of claim 1, in which:

the layered decoder includes deriving means for deriving bitstream parameters from the compressed input bitstream;

the apparatus additionally comprises a bitstream parameter forwarding path that interconnects the layered decoder to the layered encoder; and at least one of the encoding modules is connected to the parameter forwarding path and performs an encoding operation using the bitstream parameters derived from the compressed input bitstream by the deriving means.

4. Apparatus for modifying bitstream characteristics of a compressed input bitstream representing an information signal, the apparatus comprising:

a controller that provides an output bitstream definition defining bitstream characteristics of a compressed output bitstream;

a layered decoder that decodes the compressed input bitstream to provide a decoded bitstream, the layered encoder including deriving means for deriving bitstream parameters from the compressed input bitstream;

a bitstream parameter forwarding path connected to receive the bitstream parameters from the layered decoder;

a layered encoder connected to the bitstream parameter forwarding path and that re-uses the bitstream parameters derived from the compressed input bitstream by the deriving means to re-encode the decoded bitstream in accordance with the output bitstream definition to provide the compressed output bitstream.

5. The apparatus of claim 4, in which the decoded bitstream is partially encoded relative to the information signal.

6. The apparatus of claim 4, in which:

the apparatus additionally comprises a decoded bitstream processor connected to receive the decoded bitstream and to provide a modified bitstream to the layered encoder in lieu of the decoded bitstream, the decoded bitstream processor processing the decoded bitstream in a way that modifies the information signal; and the layered encoder re-uses the bitstream parameters to re-encode the modified bitstream.

7. The apparatus of claim 6, in which:

the decoded bitstream processor is additionally connected to the bitstream parameter forwarding path; and the decoded bitstream processor processes the decoded bitstream in response to the bitstream parameters derived from the compressed input bitstream by the deriving means.

8. A method for processing a compressed input bitstream representing an information signal, the method comprising:

partially decoding the compressed input bitstream to provide a decoded bitstream, the decoded bitstream being a partially-encoded bitstream representing the information signal;

generating a modified bitstream by processing the decoded bitstream in a way that modifies the information signal, the modified bitstream being a partially-encoded bitstream; and re-encoding the modified bitstream to generate a compressed output bitstream.

9. The method of claim 8, in which:

the method additionally comprises deriving bitstream parameters from the compressed input bitstream; and the modified bitstream is re-encoded using the bitstream parameters derived from the compressed input bitstream.

10. A method for modifying the bitstream characteristics of a compressed input bitstream representing an information signal, the method comprising:

generating an output bitstream definition defining bitstream characteristics of a compressed output bitstream;

deriving bitstream parameters from the compressed input bitstream;

at least partially decoding the compressed input bitstream to provide a decoded bitstream; and re-encoding the decoded bitstream using the bitstream parameters derived from the compressed input bitstream to generate the compressed output bitstream having the bitstream characteristics defined by the output bitstream definition.

11. The method of claim 10, in which the bitstream parameters derived from the compressed input bitstream are bitstream parameters generated using large computational resources.

12. The method of claim 10, in which:

the method additionally comprises processing the decoded bitstream to generate a modified bitstream, the decoded bitstream being processed in a way that modifies the information signal; and the modified bitstream is re-encoded in lieu of the decoded bitstream to generate the compressed output bitstream, the modified bitstream being re-encoded using the bitstream parameters.

13. The method in claim 10, in which the decoded bitstream is processed in response to the bitstream parameters.

14. Apparatus for processing a compressed input bitstream representing an information signal, the compressed input bitstream having a compression state, the apparatus comprising:

a first compression state translation unit that receives the compressed input bitstream as an input bitstream and changes the compression state of the compressed input bitstream to generate an output bitstream;

a processor that receives the output bitstream of the first compression state translation unit, processes the output bitstream in a way that modifies the information signal, and provides a modified bitstream; and a second compression state translation unit that receives the modified bitstream as an input bitstream and changes the compression state of the modified bitstream to generate an output bitstream, the first and second compression state translation units each including:

layered encoding/decoding modules, each having an input and an output;

an input interface module that selectively connects the input bitstream to one of the encoding/decoding modules, the one of the encoding/decoding modules depending on the compression state of the input bitstream, and an output interface module that selectively receives a bitstream from the output of one of the encoding/decoding modules as the output bitstream, the one of the encoding/decoding modules depending on the compression state of the output bitstream.

15. The apparatus of claim 14, additionally comprising means for deactivating ones of the encoding/decoding modules not required to change the compression state of the input bitstream.

16. The apparatus of claim 14, in which:

the first compression state translation unit includes means for deriving bitstream parameters from the input bitstream;

the apparatus additionally comprises a parameter forwarding path that interconnects the first compression state translation unit and the second compression state translation unit; and at least one of the encoding/decoding modules of the second compression state translation unit is connected to the parameter forwarding path and performs an encoding operation using the bitstream parameters derived from the compressed input bitstream.

17. A method for processing a compressed input bitstream representing an information signal, the compressed input bitstream having a compression state, the method comprising:

providing layered encoding/decoding modules;

selecting a first set of encoding/decoding modules and a second set of encoding/decoding modules from the layered encoding modules;

changing the compression state of the compressed input bitstream using the first set of encoding/decoding modules to provide a first output bitstream;

processing the first output bitstream to generate a modified bitstream, the first output bitstream being processed by in a way that modifies the information signal but generates the modified bitstream in the same compression state as the first output bitstream; and changing the compression state of the modified bitstream using the second set of encoding/decoding modules to generate a second output bitstream.

18. The method of claim 17, additionally comprising:

selecting one of an encoding mode and a decoding mode for the encoding/decoding modules of the first set; and selecting one of an encoding mode and a decoding mode for encoding/decoding modules of the second set.

19. The method of claim 17, in which:

the method additionally comprises deriving bitstream parameters from the compressed input bitstream; and the compression state of the modified bitstream is changed using the bitstream parameters derived from the compressed input bitstream.

20. The method of claim 17, in which:

the method additionally comprises deriving bitstream parameters from the compressed input bitstream; and the first output bitstream is processed using the bitstream parameters derived from the compressed input bitstream.

* * * * *